(12) United States Patent
Ohkawa et al.

(10) Patent No.: US 12,194,844 B2
(45) Date of Patent: Jan. 14, 2025

(54) TRANSFER DEVICE OF VEHICLE

(71) Applicant: Mazda Motor Corporation, Hiroshima (JP)

(72) Inventors: Yuzo Ohkawa, Aki-gun (JP); Kazunori Sawamura, Aki-gun (JP); Takayuki Kato, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 632 days.

(21) Appl. No.: 17/645,706

(22) Filed: Dec. 22, 2021

(65) Prior Publication Data

US 2022/0227227 A1    Jul. 21, 2022

(30) Foreign Application Priority Data

Jan. 21, 2021   (JP) .................................. 2021-008028

(51) Int. Cl.
*B60K 17/344*    (2006.01)
*B60K 17/35*     (2006.01)
(Continued)

(52) U.S. Cl.
CPC .......... *B60K 17/344* (2013.01); *B60K 17/351* (2013.01); *F16D 1/02* (2013.01); *F16D 3/223* (2013.01); *F16D 27/115* (2013.01); *F16H 1/22* (2013.01); *F16H 57/021* (2013.01); *F16H 57/023* (2013.01); *F16H 57/028* (2013.01); *F16H 57/029* (2013.01); *F16D 2023/123* (2013.01)

(58) Field of Classification Search
CPC .......... F16D 1/02; F16D 3/223; F16D 27/115; F16H 1/22; B60K 17/344; B60K 17/351
See application file for complete search history.

(56) References Cited

U.S. PATENT DOCUMENTS 5,704,868 A *  1/1998  Lindsey ................. B60K 17/22
                                              475/222
6,550,975 B2 *  4/2003  Inoue .................. B60B 27/0005
                                              384/537

(Continued)

FOREIGN PATENT DOCUMENTS

JP              6624177 B2    12/2019

*Primary Examiner* — Anne Marie M Boehler
*Assistant Examiner* — Michael R Stabley
(74) *Attorney, Agent, or Firm* — Alleman Hall & Tuttle LLP

(57) ABSTRACT

A transfer device of a vehicle is provided, in which an auxiliary-drive-wheel output shaft extending in parallel with a main-drive-wheel output shaft is connected to a propeller shaft having a universal joint. An end part of the auxiliary-drive-wheel output shaft on a propeller shaft side is formed in a hollow shape and includes a fitting part configured to be spline-engaged with a joint part provided to the universal joint. The joint part is provided with a centering part which is inserted into a centering hole formed in a flange part provided to one side of the auxiliary-drive-wheel output shaft so that the joint part is centered on the auxiliary-drive-wheel output shaft. The flange part is sandwiched between a spacer and the joint part, and a bolt member is attached to a bolt hole formed in the centering part so that the propeller shaft is assembled to the auxiliary-drive-wheel output shaft.

8 Claims, 2 Drawing Sheets

(51) Int. Cl.
*F16D 1/02* (2006.01)
*F16D 3/223* (2011.01)
*F16D 27/115* (2006.01)
*F16H 1/22* (2006.01)
*F16H 57/021* (2012.01)
*F16H 57/023* (2012.01)
*F16H 57/028* (2012.01)
*F16H 57/029* (2012.01)
*F16D 23/12* (2006.01)

(56) References Cited

U.S. PATENT DOCUMENTS

| | | | | |
|---|---|---|---|---|
| 7,811,176 | B2* | 10/2010 | Cermak | B60B 27/00 |
| | | | | 464/178 |
| 8,708,570 | B2* | 4/2014 | Umekida | F16D 1/0858 |
| | | | | 384/544 |
| 9,656,517 | B2* | 5/2017 | Mochinaga | F16D 3/223 |
| 9,829,048 | B2* | 11/2017 | Mochinaga | F16C 35/0635 |
| 10,024,416 | B2* | 7/2018 | Martin | B60K 17/28 |
| 10,112,483 | B2* | 10/2018 | DeCorte | F16H 57/0424 |
| 2003/0111285 | A1* | 6/2003 | Gansloser | B60K 17/22 |
| | | | | 180/233 |
| 2012/0281941 | A1 | 11/2012 | Umekida et al. | |
| 2013/0213157 | A1* | 8/2013 | Martin | B60K 17/28 |
| | | | | 74/15.82 |

\* cited by examiner

TRANSFER DEVICE OF VEHICLE

TECHNICAL FIELD

The present disclosure relates to a transfer device of a vehicle, particularly, a transfer device applied to a four-wheel-drive vehicle.

BACKGROUND OF THE DISCLOSURE

As four-wheel-drive (4WD) vehicles, so-called FR (front-engine rear-wheel-drive) based 4WD vehicles in which a drive source (e.g., an engine) supplies a driving force not only to rear wheels but also to front wheels are known. In such an FR-based 4WD vehicle, the drive source and a transmission are disposed at a front part of a vehicle body so that their axes extend in a front-and-rear direction of the vehicle body, and the driving force transmitted from the transmission is sent to the rear wheels (main drive wheels) through a rear-wheel output shaft extending rearwardly via a rear-wheel propeller shaft and a rear-wheel differential gear. In addition, a transfer device which extracts a driving force to be transmitted to the front wheels (auxiliary drive wheels) is provided on the rear-wheel output shaft, and the driving force extracted to a front-wheel output shaft of the transfer device is transmitted to the front wheels via a front-wheel propeller shaft extending forwardly and a front-wheel differential gear.

As such a transfer device, it is known that the transfer device is provided, on the rear-wheel output shaft, with a coupling which extracts the driving force for the front wheels, and the driving force extracted by the coupling is transmitted to the front-wheel output shaft via a chain-type or a gear-type powertrain mechanism.

In the 4WD vehicle with the transfer device, generally, each of the front-wheel propeller shaft and the rear-wheel propeller shaft is coupled to the front-wheel output shaft or the rear-wheel output shaft via a universal joint provided to an end part of the propeller shaft on the transfer device side.

When the front-wheel propeller shaft is coupled to the front-wheel output shaft which is disposed in parallel with the rear-wheel output shaft, a joint part provided to a component member of the universal joint of the front-wheel propeller shaft may be spline-engaged with the front-wheel output shaft, and a bolt member may be used to retain the front-wheel propeller shaft.

For example, JP6624177B2 discloses a transfer device in which a joint part of a front-wheel propeller shaft is spline-engaged with a front-wheel output shaft, and a bolt member is inserted from an end part of the front-wheel output shaft on the opposite side from the front-wheel propeller shaft toward the joint part to be threadedly engaged, and thereby, the front-wheel propeller shaft being retained.

Further, in the transfer device disclosed in JP6624177B2, in order to improve assemblability of the front-wheel propeller shaft with respect to the front-wheel output shaft, the front-wheel propeller shaft is attached to the front-wheel output shaft by making a spline-engagement part between the front-wheel output shaft and the joint part of the front-wheel propeller shaft be a non-press fitting, and inserting the bolt member into a sleeve member, which is fitted into the front-wheel output shaft, to be threadedly engaged with the joint part. Accordingly, since the front-wheel propeller shaft is attached to the front-wheel output shaft in the state where the bolt member is integrally assembled to the joint part, it is suppressed that the bolt member is loosened with respect to the joint part due to a relative rotation caused by backlash in a rotational direction at the spline-engagement part between the front-wheel output shaft and the joint part.

On the other hand, due to the backlash at the non-press fitted spline-engagement part between the joint part and the front-wheel output shaft as an auxiliary-drive-wheel output shaft, the joint part may be moved with respect to the front-wheel output shaft and cause vibration.

SUMMARY OF THE DISCLOSURE

The present disclosure is made in view of the above situations, and one purpose thereof is to provide a transfer device of a vehicle, capable of reducing vibration of a joint part of a propeller shaft to an output shaft for auxiliary drive wheels, and suppressing loosening of a bolt member thread-edly engaged with the joint part.

According to one aspect of the present disclosure, a transfer device of a vehicle is provided, which includes a main-drive-wheel output shaft coupled to an output shaft of a transmission and extending to one side in a front-and-rear direction of the vehicle, an auxiliary-drive-wheel output shaft disposed in parallel with the main-drive-wheel output shaft, and a powertrain mechanism configured to transmit a driving force extracted from the main-drive-wheel output shaft to the auxiliary-drive-wheel output shaft. The auxiliary-drive-wheel output shaft is connected to a propeller shaft extending to the other side in the vehicle front-and-rear direction and having a universal joint at an end part thereof on an auxiliary-drive-wheel output shaft side. An end part of the auxiliary-drive-wheel output shaft on a propeller shaft side is formed in a hollow shape and includes a fitting part configured to be spline-engaged with a joint part provided to a component member of the universal joint of the propeller shaft, and the spline-engagement between the fitting part of the auxiliary-drive-wheel output shaft and the joint part of the propeller shaft is a non-press fitting. The joint part is provided, at an end part thereof on the one side, with a centering part extending to the one side and having an outer diameter smaller than an outer diameter of the joint part. The centering part is provided, at an end part thereof on the one side, with a bolt hole extending to the other side. The auxiliary-drive-wheel output shaft is provided, on the one side of the fitting part, with a flange part extending to radially inward of the auxiliary-drive-wheel output shaft and having a centering hole corresponding to the centering part. A spacer is disposed on the one side of the flange part, and a bolt member is disposed on the one side of the spacer to be inserted into the spacer from the one side toward the bolt hole of the centering part and attached to the bolt hole. The centering part is inserted into the centering hole so that the joint part is centered on the auxiliary-drive-wheel output shaft. The flange part is sandwiched between the spacer and the joint part, and the bolt member is attached to the bolt hole so that the propeller shaft is assembled to the auxiliary-drive-wheel output shaft.

According to this configuration, since the joint part of the propeller shaft is centered on the auxiliary-drive-wheel output shaft by the centering part, the vibration of the joint part of the propeller shaft with respect to the auxiliary-drive-wheel output shaft can be reduced. Moreover, by the flange part of the auxiliary-drive-wheel output shaft being sandwiched between the spacer and the joint part, and the bolt member being attached to the bolt hole provided to the centering part of the joint part while being inserted into the spacer from the one side in the vehicle front-and-rear direction, the bolt member is suppressed from being loosened with respect to the bolt hole due to a relative rotation caused by backlash in a rotational direction between the fitting part of the auxiliary-drive-wheel output shaft and the joint part which are splined-engaged with each other.

A length of the flange part in the vehicle front-and-rear direction may be shorter than a distance between the end part of the joint part on the one side and an end part of the spacer on the other side in the vehicle front-and-rear direction.

According to this configuration, a gap is made between the flange part of the auxiliary-drive-wheel output shaft and the spacer and/or between the flange part and the joint part of the propeller shaft. Moreover, since the spline-engagement between the fitting part of the auxiliary-drive-wheel output shaft and the joint part is a non-press fitting, the joint part rotates relative to the auxiliary-drive-wheel output shaft. In this state, because of the gap, it is difficult for a force in the rotational direction to loosen the bolt member by acting on a seat of the bolt member attached to the bolt hole. Therefore, the loosening of the bolt member can be prevented.

The joint part may be provided, at the end part thereof on the one side, with an intermediate shaft part extending to the one side between the joint part and the centering part and having an outer diameter smaller than the outer diameter of the joint part and larger than the outer diameter of the centering part.

According to this configuration, since the joint part of the propeller shaft is provided with the intermediate shaft part, the length between the end part of the joint part at the one side and the end part of the centering part at the one side becomes longer. Accordingly, the vibration of the joint part is further suppressed, and assemblability upon the spline-engagement of the fitting part of the auxiliary-drive-wheel output shaft with the joint part of the propeller shaft is improved.

A length of the flange part in the vehicle front-and-rear direction may be shorter than a distance between an end part of the intermediate shaft part on the one side and an end part of the spacer on the other side in the vehicle front-and-rear direction.

According to this configuration, the gap is made between the flange part of the auxiliary-drive-wheel output shaft and the spacer and/or between the flange part and the intermediate shaft part of the propeller shaft. Because of this gap, when the joint part of the propeller shaft rotates relative to the auxiliary-drive-wheel output shaft, it is difficult for a force in the rotational direction to loosen the bolt member by acting on the seat of the bolt member attached to the bolt hole. Therefore, the loosening of the bolt member can be prevented.

The auxiliary-drive-wheel output shaft may be provided with a spacer holding part extending to the one side from the flange part and having a spacer insertion hole into which the spacer is inserted. A first seal member may be provided at the other side of the fitting part of the auxiliary-drive-wheel output shaft so as to seal between the auxiliary-drive-wheel output shaft and the joint part, and a second seal member may be provided to an outer circumferential surface of the spacer so as to seal between the spacer holding part and the spacer.

According to this configuration, since the fitting part of the auxiliary-drive-wheel output shaft, the joint part of the propeller shaft, and the centering part of the joint part inserted into the centering hole of the flange part of the auxiliary-drive-wheel output shaft are located between the first and second seal members in the vehicle front-and-rear direction, it can be avoided that foreign matter enters from outside and is caught between the fitting part and the joint part, and between the centering hole and the centering part. Therefore, the vibration of the joint part of the propeller shaft with respect to the auxiliary-drive-wheel output shaft can further certainly be reduced.

DETAILED DESCRIPTION OF THE DISCLOSURE

Hereinafter, one embodiment of the present disclosure is described with reference to the accompanying drawings.

Figure 1:
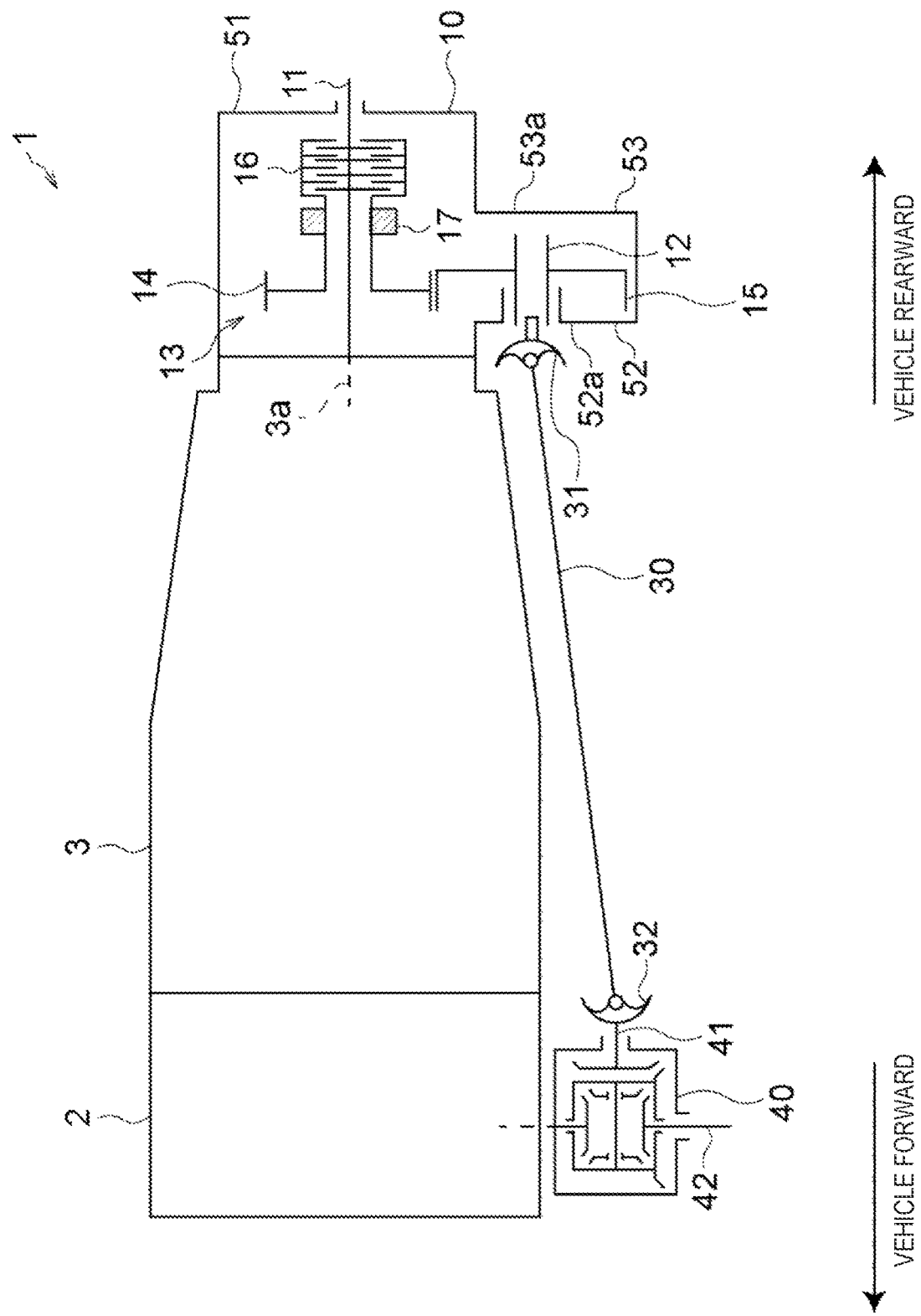
FIG. 1 is a schematic diagram illustrating a powertrain mechanism of a four-wheel-drive vehicle on which a transfer device of the vehicle according to one embodiment of the present disclosure is mounted.

FIG. 1 is a schematic diagram illustrating a powertrain mechanism of a four-wheel-drive vehicle on which a transfer device according to this embodiment of the present disclosure is mounted. As illustrated in FIG. 1, the four-wheel-drive (4WD) vehicle 1 on which the transfer device according to this embodiment is mounted, is a front-engine rear-wheel-drive (FR) based 4WD vehicle, and an engine 2 as a drive source and a transmission 3 are disposed at a front part of a vehicle body so that their axes extend in a front-and-rear direction of the vehicle body.

On the rear side of the transmission 3, a transfer device 10 is provided to transmit a driving force sent from the engine 2 through the transmission 3, to rear wheels (main drive wheels) via a rear-wheel propeller shaft extending to the vehicle-body rear side and a rear-wheel differential gear, as well as to extract a driving force to be transmitted to front wheels (auxiliary drive wheels).

The transfer device 10 includes a rear-wheel output shaft 11 (main-drive-wheel output shaft) coupled to an output shaft 3a of the transmission 3 and extending rearwardly (one side in the vehicle front-and-rear direction), a front-wheel output shaft 12 (auxiliary-drive-wheel output shaft) disposed in parallel with the rear-wheel output shaft 11, and a powertrain mechanism 13 which transmits the driving force extracted from the rear-wheel output shaft 11 to the front-wheel output shaft 12.

The transfer device 10 also includes a coupling 16 provided on the rear-wheel output shaft 11 and coupled to the rear-wheel output shaft 11 to extract the driving force for the front wheels from the driving force transmitted to the rear-wheel output shaft 11. For example, an electromagnetic-type coupling is used as the coupling 16.

The powertrain mechanism 13 is a gear type, and includes a drive gear 14 which is provided on the front side of the coupling 16 on the rear-wheel output shaft 11 so as to be coupled to the coupling 16, and a driven gear 15 which is provided on the front-wheel output shaft 12 and coupled thereto to mesh with the drive gear 14. The powertrain mechanism 13 transmits the front-wheel driving force, which is extracted from the rear-wheel output shaft 11 by the coupling 16, to the front-wheel output shaft 12.

A front-wheel propeller shaft 30 extending forwardly is coupled to a front end part of the front-wheel output shaft 12. The front-wheel propeller shaft 30 has a universal joint 31 at its rear end part, and is coupled to the front-wheel output shaft 12 via the universal joint 31.

The front-wheel propeller shaft 30 also includes a universal joint 32 at its front end part, and is coupled to an input shaft 41 of a front-wheel differential gear 40 via the universal joint 32. The input shaft 41 of the front-wheel differential gear 40 is coupled to an axle 42 which is coupled to each of the left and right front wheels.

Accordingly, the front-wheel driving force extracted from the rear-wheel output shaft 11 by the coupling 16 is transmitted to the front-wheel output shaft 12 via the powertrain mechanism 13, and then transmitted from the front-wheel output shaft 12 to the front wheels via the front-wheel propeller shaft 30 and the front-wheel differential gear 40.

In the 4WD vehicle 1, the coupling 16 extracts the front-wheel driving force while changing a front/rear torque distribution ratio of the front wheels to the rear wheels within a range from 0:100 to 50:50. Note that operation of the coupling 16 is controlled by a control unit (not illustrated).

The transfer device 10 also includes a damper 17 on the rear-wheel output shaft 11 between the coupling 16 and the drive gear 14. The damper 17 lowers a resonance frequency at which the front-wheel side drive system (from the coupling 16 to the front wheels via the drive gear 14, the driven gear 15, the front-wheel output shaft 12, the front-wheel propeller shaft 30, and the front-wheel differential gear 40) resonates with a torque vibration of the engine 2, to be below a practical range of the engine 2.

Next, the transfer device 10 is described in more detail with reference to FIG. 2.

Figure 2:
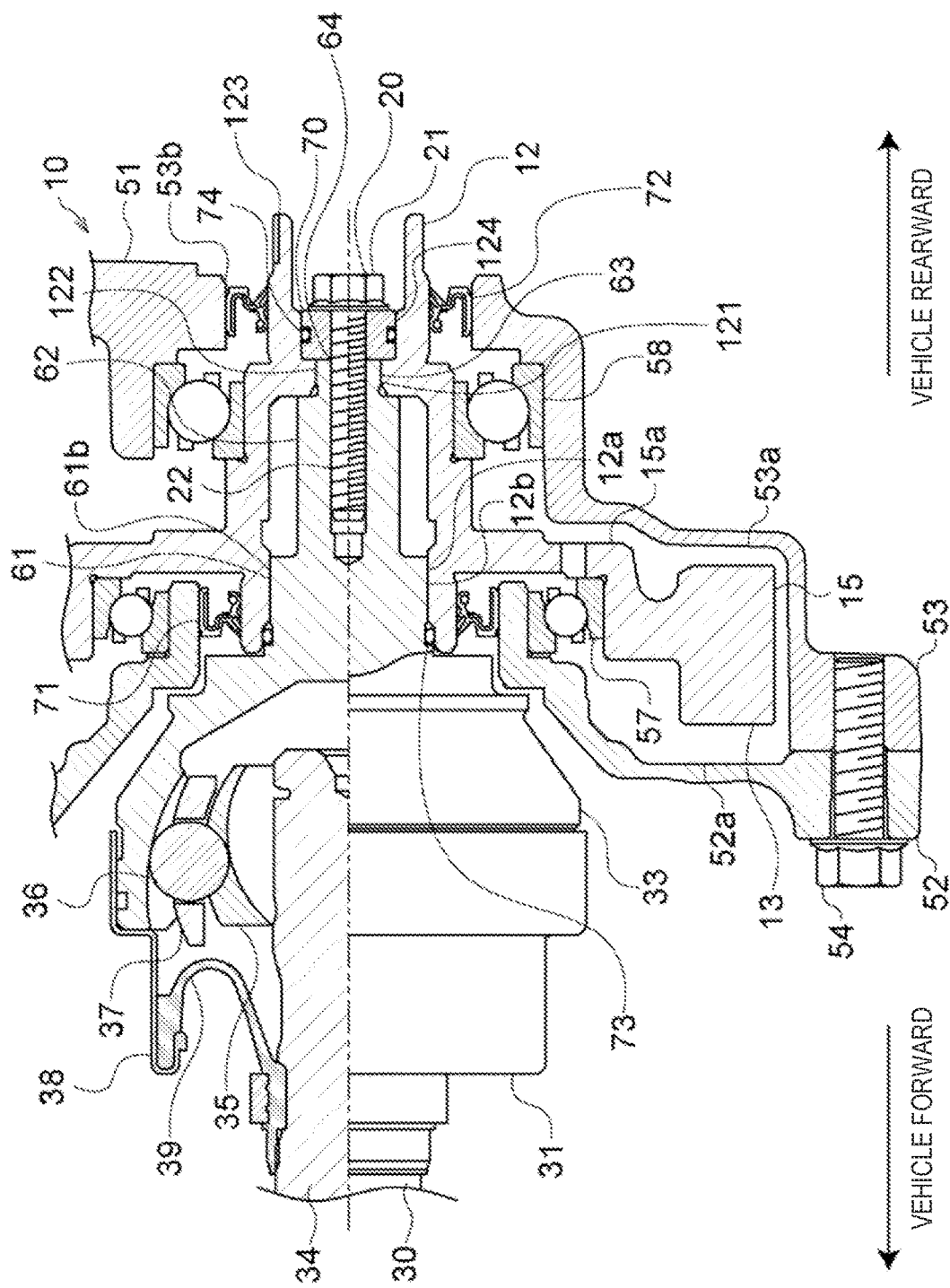
FIG. 2 is a cross-sectional view illustrating an output shaft for auxiliary drive wheels of the transfer device illustrated in FIG. 1.

FIG. 2 is a cross-sectional view illustrating the front-wheel output shaft 12 of the transfer device 10 illustrated in FIG. 1. As illustrated in FIG. 2, the transfer device 10 is provided with a transfer case 51, and the transfer case 51 includes a first case member 52 and a second case member 53 disposed in this order from forward. The first case member 52 and the second case member 53 are fastened to each other using a fastening bolt (screw) 54.

As illustrated in FIG. 1, each of the rear-wheel output shaft 11 coupled to the output shaft 3a of the transmission 3, and the front-wheel output shaft 12 disposed in parallel with the rear-wheel output shaft 11 is rotatably supported inside the transfer case 51.

The powertrain mechanism 13 is disposed inside the transfer case 51 between a vertical wall part 52a of the first case member 52 and a vertical wall part 53a of the second case member 53, and the drive gear 14 is disposed on the rear-wheel output shaft 11 and the driven gear 15 is disposed on the front-wheel output shaft 12.

As illustrated in the drawing, the driven gear 15 is provided with a rear extending part 15a extending radially inwardly and rearwardly, and the radial inward of the rear extending part 15a is coupled to the front-wheel output shaft 12 to be formed integrally with the front-wheel output shaft 12.

The driven gear 15 is rotatably supported by the transfer case 51 via a bearing 57 disposed between an inner circumferential surface of the driven gear 15 and the transfer case 51, and a bearing 58 disposed between the rear side of the front-wheel output shaft 12 and the transfer case 51.

The front-wheel output shaft 12 is formed in a hollow shape, and extends in the front-and-rear direction of the rear extending part 15a provided to the driven gear 15. The vehicle-body front side of the front-wheel output shaft 12 is coupled to the front-wheel propeller shaft 30 (hereinafter, referred to as the "propeller shaft 30") via the universal joint 31.

The universal joint 31 is provided with, as component members, an outer joint member 33 provided at the transfer device 10 side, an inner joint member 35 coupled to a shaft member 34 of the propeller shaft 30, a ball 36 interposed between the outer joint member 33 and the inner joint member 35 to transmit motive force therebetween, and a cage 37 disposed between an inner circumferential surface of the outer joint member 33 and an outer circumferential surface of the inner joint member 35 to hold the ball 36. Accordingly, the universal joint 31 can transmit the motive force between the outer joint member 33 and the shaft member 34.

The universal joint 31 further includes a cover member 38 provided to cover a movable range of the shaft member 34, and a boot 39 provided to cover between the shaft member 34 and the cover member 38. The cover member 38 is provided to extend substantially cylindrically to the front side from the outer joint member 33. The boot 39 is made of elastic material, such as rubber, and provided so as to seal between an outer circumferential surface of the shaft member 34 and an inner circumferential surface of the cover member 38.

The outer joint member 33 of the universal joint 31 is provided with a joint part 61 extending rearwardly. The joint part 61 is formed in a substantially cylindrical shape, and is formed, on its outer circumferential surface, with a spline part 61b extending in an axial direction of the joint part 61.

An inner circumferential surface of a front end part of the front-wheel output shaft 12 is provided with a fitting part 12a which is spline-engaged with the joint part 61 of the propeller shaft 30. The fitting part 12a is formed with a spline part 12b extending in an axial direction of the front-wheel output shaft 12. The spline part 61b of the joint part 61 of the propeller shaft 30 is fitted into the spline part 12b of the fitting part 12a of the front-wheel output shaft 12 so that the fitting part 12a of the front-wheel output shaft 12 is spline-engaged with the joint part 61 of the propeller shaft 30.

In the spline part 12b formed in the front end part of the front-wheel output shaft 12, tooth parts and groove parts are formed in parallel with the axis of the front-wheel output shaft 12. Further, in the spline part 61b formed in the joint part 61 of the propeller shaft 30, tooth parts and groove parts are formed in parallel with the axis of the joint part 61, and thereby, the spline-engagement between the fitting part 12a of the front-wheel output shaft 12 and the joint part 61 of the propeller shaft 30 is a non-press fitting.

The joint part 61 of the propeller shaft 30 is provided with an intermediate shaft part 62 extending rearwardly. The intermediate shaft part 62 is formed in a substantially cylindrical shape with an outer diameter smaller than that of the joint part 61.

The intermediate shaft part 62 of the propeller shaft 30 is provided with a centering part 63 extending rearwardly. The centering part 63 is formed in a substantially cylindrical shape with an outer diameter smaller than that of the intermediate shaft part 62. Further, the joint part 61, the intermediate shaft part 62, and the centering part 63 are provided so as to be coaxial with each other.

The centering part 63 is formed, at its rear end part, with a bolt hole 64 extending forwardly through the centering part 63 and the intermediate shaft part 62.

Further, the front-wheel output shaft 12 is formed, on the rear side of the fitting part 12a, with a flange part 121 extending radially inwardly from an inner circumferential surface of the front-wheel output shaft 12.

The flange part 121 extends radially inwardly from the inner circumferential surface of the front-wheel output shaft 12, thus having a centering hole 122 corresponding to the centering part 63. This centering hole 122 is formed in a circular shape and configured so that an axis of the centering hole 122 is in agreement with the axis of the front-wheel output shaft 12, an inner diameter of the centering hole 122 is larger than the outer diameter of the centering part 63, and a length of the centering hole 122 in the front-and-rear direction is shorter than that of the centering part 63. For example, the length of the centering hole 122 in the front-and-rear direction is set to 5.8 mm, and that of the centering part 63 is set to 6.2 mm. For example, the difference between the lengths of the centering part 63 and the centering hole 122 is set within a range from 0.1 mm to 1 mm.

On the rear side of the flange part 121, a substantially cylindrical spacer 70 is disposed so as to extend rearwardly. The front-wheel output shaft 12 is provided, on the rear side of the flange part 121, with a spacer holding part 123 extending rearwardly to hold the spacer 70. The spacer holding part 123 has a spacer insertion hole 124 which extends rearwardly, and the spacer 70 is inserted therein. This spacer insertion hole 124 is configured so that an inner diameter of the spacer insertion hole 124 is larger than the inner diameter of the centering hole 122 and an outer diameter of the spacer 70.

On the rear side of the spacer 70, a bolt member 20 is disposed, which is inserted from the rear side of the spacer 70 into the bolt hole 64 of the centering part 63 to be attached to the bolt hole 64. The transfer case 51 is formed with an insertion hole 53b corresponding to a rear end part of the front-wheel output shaft 12, and the spacer 70 and the bolt member 20 can be inserted therein.

The bolt member 20 has a hexagonal head part 21, and a screw part 22 extending forwardly from the head part 21.

In the transfer device 10, upon assembling of the propeller shaft 30 to the front-wheel output shaft 12, the centering part 63 provided to the joint part 61 is inserted into the centering hole 122 of the flange part 121 of the front-wheel output shaft 12 while the rear side of the spline part 61b of the joint part 61 is fitted into the front side of the spline part 12b of the front-wheel output shaft 12, and thus, the joint part 61 is centered on the front-wheel output shaft 12. In this state, the spacer 70 is inserted into the spacer insertion hole 124 from the rear end part of the front-wheel output shaft 12, and the bolt member 20 is inserted into the spacer 70 toward the bolt hole 64 of the centering part 63 from the rear end part of the front-wheel output shaft 12. As a result, the joint part 61 of the propeller shaft 30 is attached to the fitting part 12a of the front-wheel output shaft 12.

When the bolt member 20 is attached to the bolt hole 64, the spacer 70 located between the head part 21 of the bolt member 20 and the centering part 63 of the joint part 61 contacts the centering part 63. Here, the length of the centering part 63 in the front-and-rear direction is equal to a distance in the front-and-rear direction between a rear end part of the intermediate shaft part 62 of the joint part 61, and a front end part of the spacer 70. Therefore, since the distance between the rear end part of the intermediate shaft part 62 and the front end part of the spacer 70 is longer than the length of the centering hole 122 of the flange part 121 (i.e., the length of the flange part 121) in the front-and-rear direction, the flange part 121 is sandwiched between the spacer 70 and the intermediate shaft part 62 while having a gap between the flange part 121 and the spacer 70 and/or between the flange part 121 and the intermediate shaft part 62. This gap allows that the bolt member 20 is fastened to generate a given axial force while pushing a rear end surface of the centering part 63 without pushing the flange part 121 in a state where the flange part 121 is sandwiched between the intermediate shaft part 62 and the head part 21 of the bolt member 20 via the spacer 70.

The transfer device 10 is also provided with a plurality of seal members which prevent lubricant inside the transfer case 51 from leaking outside. As illustrated in FIG. 2, a seal member 71 is provided between the first case member 52 and the front side of the front-wheel output shaft 12, and a seal member 72 is provided between the second case member 53 and the rear side of the front-wheel output shaft 12. Moreover, grease is supplied between the fitting part 12a of the front-wheel output shaft 12 and the joint part 61 of the propeller shaft 30, a seal member 73 is provided between the joint part 61 and the front side of the fitting part 12a, and a seal member 74 is provided between the spacer holding part 123 and the spacer 70.

Although in this embodiment the intermediate shaft part 62 is provided between the joint part 61 and the centering part 63 of the propeller shaft 30, a centering part extending rearwardly may be provided to the joint part of the propeller shaft. In this case, a distance from the front end part of the front-wheel output shaft to a front end part of the flange part in the front-and-rear direction is desirable to be slightly shorter than the length of the joint part in the front-and-rear direction.

As described above, in the transfer device 10 according to this embodiment, the fitting part 12a formed in the end part of the front-wheel output shaft 12 on the propeller shaft side is spline-engaged with the joint part 61 provided to the universal joint 31 of the propeller shaft 30, and the centering part 63 provided to the joint part 61 is inserted into the centering hole 122 of the flange part 121 of the front-wheel output shaft 12, thereby the joint part 61 being centered on the front-wheel output shaft 12. Then, the spacer 70 is inserted into the spacer insertion hole 124 from the rear end part of the front-wheel output shaft 12, and the bolt member 20 is inserted into the spacer 70 toward the bolt hole 64 of the centering part 63 from the rear end part of the front-wheel output shaft 12 to be fastened to the bolt hole 64, thereby the joint part 61 of the propeller shaft 30 being attached to the fitting part 12a formed at the front side of the front-wheel output shaft 12.

According to this, since the joint part 61 of the propeller shaft 30 is centered on the front-wheel output shaft 12 by the centering part 63, the vibration of the joint part 61 of the propeller shaft 30 with respect to the front-wheel output shaft 12 can be reduced. Moreover, by the flange part 121 of the front-wheel output shaft 12 being sandwiched between the spacer 70 and the joint part 61, and the bolt member 20 being attached to the bolt hole 64 provided to the centering part 63 of the joint part 61 while being inserted into the spacer 70 from the rear side, it is suppressed that the bolt member 20 is loosened with respect to the bolt hole 64 due to a relative rotation caused by backlash in the rotational direction between the fitting part 12a of the front-wheel output shaft 12 and the joint part 61 which are splined-engaged with each other.

Further, since the joint part 61 of the propeller shaft 30 is provided with the intermediate shaft part 62, the length between the rear end part of the joint part 61 and the rear end part of the centering part 63 becomes longer. According to this, the vibration of the joint part 61 is further suppressed, and assemblability upon the spline-engagement of the fitting part 12a of the front-wheel output shaft 12 with the joint part 61 of the propeller shaft 30 is improved.

Further, the gap is made between the flange part 121 of the front-wheel output shaft 12 and the spacer 70 and/or between the flange part 121 and the intermediate shaft part 62 of the propeller shaft 30. Because of this gap, when the joint part 61 of the propeller shaft 30 rotates relative to the front-wheel output shaft 12, a force in a rotational direction to loosen the bolt member 20 is difficult to be acted on a seat of the bolt member 20 attached to the bolt hole 64. Therefore, the loosening of the bolt member 20 can be prevented.

Further, since the fitting part 12a of the front-wheel output shaft 12, the joint part 61 of the propeller shaft 30, and the centering part 63 of the joint part 61 inserted into the centering hole 122 of the flange part 121 of the front-wheel output shaft 12 are located between the seal members 73 and 74 in the front-and-rear direction, it can be avoided that foreign matters enter from outside and are caught between the fitting part 12a and the joint part 61, and between the centering hole 122 and the centering part 63. Therefore, the vibration of the joint part 61 of the propeller shaft 30 with respect to the front-wheel output shaft 12 can certainly be reduced.

The present disclosure is not limited by the illustrated embodiment, but various improvements and changes in design are possible without departing from the spirit of the present disclosure.

As described above, according to the present disclosure, in the transfer device mounted on the 4WD vehicle, the vibration of the joint part of the propeller shaft with respect to the output shaft for the auxiliary drive wheels is reduced, as well as the coming off of the propeller shaft being suppressed, and thereby, the present disclosure may suitably be used in a field of manufacturing this type of vehicles.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Four-wheel-drive Vehicle
3 Transmission
3a Output Shaft of Transmission
10 Transfer Device
11 Rear-wheel Output Shaft (Main-drive-wheel Output Shaft)
12 Front-wheel Output Shaft (Auxiliary-drive-wheel Output Shaft)
12a Fitting Part
13 Powertrain Mechanism
20 Bolt Member
30 Propeller Shaft
31 Universal Joint
61 Joint Part
63 Centering Part
64 Bolt Hole
70 Spacer
121 Flange Part
122 Centering Hole

What is claimed is:

1. A transfer device of a vehicle, comprising:
    a main-drive-wheel output shaft coupled to an output shaft of a transmission and extending to one side in a front-and-rear direction of the vehicle;
    an auxiliary-drive-wheel output shaft disposed in parallel with the main-drive-wheel output shaft; and
    a powertrain mechanism configured to transmit a driving force extracted from the main-drive-wheel output shaft to the auxiliary-drive-wheel output shaft,
    wherein the auxiliary-drive-wheel output shaft is connected to a propeller shaft extending to the other side in the vehicle front-and-rear direction and having a universal joint at an end part thereof on the auxiliary-drive-wheel output shaft side,
    wherein an end part of the auxiliary-drive-wheel output shaft on the propeller shaft side is formed in a hollow shape and includes a fitting part configured to be spline-engaged with a joint part provided to a component member of the universal joint of the propeller shaft,
    wherein the spline-engagement between the fitting part of the auxiliary-drive-wheel output shaft and the joint part of the propeller shaft is a non-press fitting,
    wherein the joint part is provided, at an end part thereof on the one side, with a centering part extending to the one side and having an outer diameter smaller than an outer diameter of the joint part,
    wherein the centering part is provided, at an end part thereof on the one side, with a bolt hole extending to the other side,
    wherein the auxiliary-drive-wheel output shaft is provided, on the one side of the fitting part, with a flange part extending to radially inward of the auxiliary-drive-wheel output shaft and having a centering hole corresponding to the centering part,
    wherein a spacer is disposed on the one side of the flange part,
    wherein a bolt member is disposed on the one side of the spacer to be inserted into the spacer from the one side toward the bolt hole of the centering part and attached to the bolt hole,
    wherein the centering part is inserted into the centering hole so that the joint part is centered on the auxiliary-drive-wheel output shaft, and
    wherein the flange part is sandwiched between the spacer and the joint part, and the bolt member is attached to the bolt hole so that the propeller shaft is assembled to the auxiliary-drive-wheel output shaft.

2. The transfer device of claim 1, wherein a length of the flange part in the vehicle front-and-rear direction is shorter than a distance between the end part of the joint part on the one side and an end part of the spacer on the other side in the vehicle front-and-rear direction.

3. The transfer device of claim 2,
    wherein the auxiliary-drive-wheel output shaft is provided with a spacer holding part extending to the one side from the flange part and having a spacer insertion hole into which the spacer is inserted,
    wherein a first seal member is provided at the other side of the fitting part of the auxiliary-drive-wheel output shaft so as to seal between the auxiliary-drive-wheel output shaft and the joint part, and
    wherein a second seal member is provided to an outer circumferential surface of the spacer so as to seal between the spacer holding part and the spacer.

4. The transfer device of claim 1, wherein the joint part is provided, at the end part thereof on the one side, with an intermediate shaft part extending to the one side between the joint part and the centering part and having an outer diameter smaller than the outer diameter of the joint part and larger than the outer diameter of the centering part.

5. The transfer device of claim 4, wherein a length of the flange part in the vehicle front-and-rear direction is shorter than a distance between an end part of the intermediate shaft part on the one side and an end part of the spacer on the other side in the vehicle front-and-rear direction.

6. The transfer device of claim 5,
wherein the auxiliary-drive-wheel output shaft is provided with a spacer holding part extending to the one side from the flange part and having a spacer insertion hole into which the spacer is inserted,
wherein a first seal member is provided at the other side of the fitting part of the auxiliary-drive-wheel output shaft so as to seal between the auxiliary-drive-wheel output shaft and the joint part, and
wherein a second seal member is provided to an outer circumferential surface of the spacer so as to seal between the spacer holding part and the spacer.

7. The transfer device of claim 4,
wherein the auxiliary-drive-wheel output shaft is provided with a spacer holding part extending to the one side from the flange part and having a spacer insertion hole into which the spacer is inserted,
wherein a first seal member is provided at the other side of the fitting part of the auxiliary-drive-wheel output shaft so as to seal between the auxiliary-drive-wheel output shaft and the joint part, and
wherein a second seal member is provided to an outer circumferential surface of the spacer so as to seal between the spacer holding part and the spacer.

8. The transfer device of claim 1,
wherein the auxiliary-drive-wheel output shaft is provided with a spacer holding part extending to the one side from the flange part and having a spacer insertion hole into which the spacer is inserted,
wherein a first seal member is provided at the other side of the fitting part of the auxiliary-drive-wheel output shaft so as to seal between the auxiliary-drive-wheel output shaft and the joint part, and
wherein a second seal member is provided to an outer circumferential surface of the spacer so as to seal between the spacer holding part and the spacer.

* * * * *